(12) United States Patent
Hiraguchi (10) Patent No.: US 7,104,489 B2
(45) Date of Patent: Sep. 12, 2006

(54) RECORDING TAPE CARTRIDGE (75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 48 days.

(21) Appl. No.: 10/670,369

(22) Filed: Sep. 26, 2003

(65) Prior Publication Data
US 2004/0061014 A1    Apr. 1, 2004

(30) Foreign Application Priority Data
Sep. 30, 2002    (JP)    ............... 2002-285971

(51) Int. Cl.
G11B 23/107    (2006.01)
(52) U.S. Cl. .................................... 242/348
(58) Field of Classification Search ................ 242/348, 242/348.1, 348.2, 348.3, 348.4; 206/307, 206/389, 459.5, 508, 509; 360/95, 132
See application file for complete search history.

(56) References Cited
U.S. PATENT DOCUMENTS 4,305,524 A * 12/1981 McLaren et al. ........... 220/780
4,703,853 A * 11/1987 Byrns ..................... 206/387.13
4,801,035 A *  1/1989 Sugiyama et al. ........... 220/3.8
5,209,424 A *  5/1993 Fischer et al. .............. 242/348
5,351,159 A *  9/1994 Dodt et al. ................. 360/132
5,432,656 A    7/1995 Motoyama et al.
6,640,972 B1 * 11/2003 Morita ................... 206/387.14
6,717,771 B1 *  4/2004 Morita et al. ............... 360/132

FOREIGN PATENT DOCUMENTS
JP    5-33382 U    4/1993

* cited by examiner

Primary Examiner—John Q. Nguyen
Assistant Examiner—Scott Haugland
(74) Attorney, Agent, or Firm—Sughrue Mion, PLLC (57) ABSTRACT In order to provide a recording tape cartridge which always can be piled up stably while a region for a label can be secured, there is provided a recording tape cartridge comprising a case having a substantially boxed shape and rotatably accommodating a reel around which a recording tape is wound, a recessed portion formed on an upper surface of the case, and a stacking rib protrudingly provided manner on a lower surface of the case, for engaging with the recessed portion when a plurality of the recording tape cartridges is stacked, a protruding portion, which defines a label region, being formed at a position in the recessed portion, which position does not interfere with the stacking rib when the plurality of the recording tape cartridges is stacked.

19 Claims, 9 Drawing Sheets

PRIOR ART

FIG. 8B

PRIOR ART

FIG. 9

RECORDING TAPE CARTRIDGE

CROSS-REFERENCE TO RELATED APPLICATION

This application claims priority under 35USC 119 from Japanese Patent Application No. 2002-285971, the disclosure of which is incorporated by reference herein.

BACKGROUND OF THE INVENTION

1. Field of the Invention

The present invention principally relates to a recording tape cartridge which accommodates a single reel onto which recording tape such as a magnetic tape or the like is wound in a case, for use as a recording/replaying medium for computers and the like.

2. Description of the Related Art

Conventionally, a magnetic tape cartridge has been known in which a magnetic tape, which is used as a data recording/replaying medium for computers or the like, is wound onto a single reel and this reel is accommodated in a case. At a distal end of such a magnetic tape, a leader member, such as a leader pin, a leader tape, a leader block or the like is provided. Drawing-out means, which is provided at a drive device, draws the leader member out through an opening of the magnetic tape cartridge and winds the magnetic tape, which is fixed to the leader member, onto a drive device side winding reel.

A reel gear is provided in an annular form at a lower face center of the reel and exposed through an opening hole, which is formed in a lower face of the magnetic tape cartridge. A drive gear, which is provided at a drive device side rotation shaft, meshes with the reel gear. By this structure, the reel is driven to rotate. When the reel of the magnetic tape cartridge and the winding reel of the drive device are rotated at the same time, data can be recorded to the magnetic tape and/or data that has been recorded to the magnetic tape can be replayed.

Figure 8A:
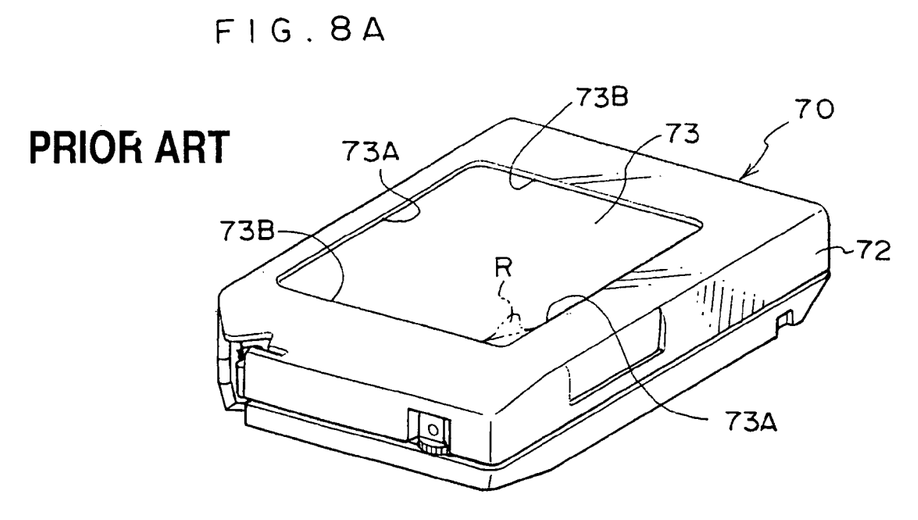
FIG. 8A is a schematic perspective view of a conventional magnetic tape cartridge seen from an oblique front-above.
Figure 8B:
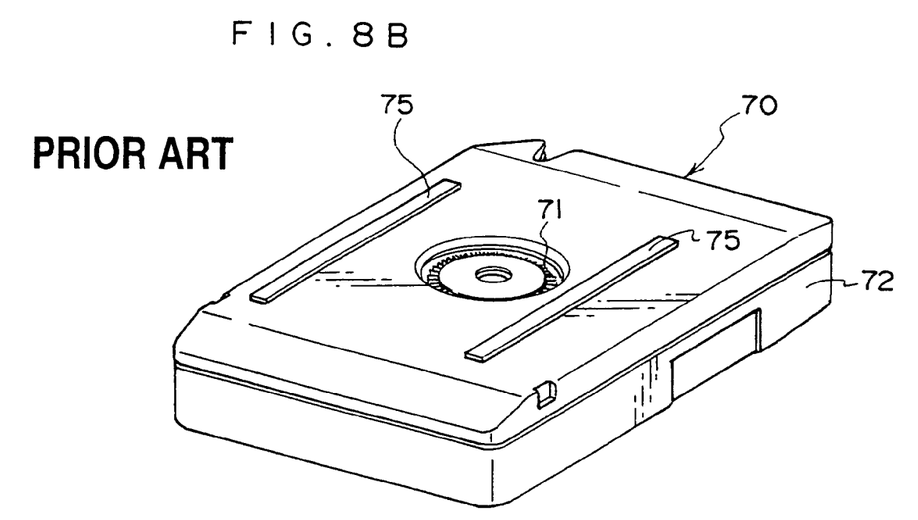
FIG. 8B is a schematic perspective view of a conventional magnetic tape cartridge seen from an oblique rear-below.

In a magnetic tape cartridge having such structure, large amounts of information can be recorded, on the other hand, a little space is sufficient for the magnetic tape cartridge when it is stored. As shown in FIGS. 8A and 8B, when a plurality of magnetic tape cartridges 70 are stored in a stacking manner, in order to pile up the plurality of the magnetic tape cartridges 70 stably, a recessed portion 73, which also serves as a region for a label, is formed on an upper surface of an upper case 72, and stacking ribs 75, which are engaged with wall portions 73A of both right and left ends of the recessed portion 73 and both front and rear ends of the recessed portion 73, are formed on a lower surface of a lower case 74. (For example, refer to Japanese Utility Model Application Laid-Open (JP-U) No. 5-33382)

However, because the recessed portion 73, with which the stacking ribs 75 are engaged, also serves as the region for a label as mentioned above, when a label R is pasted on the recessed portion 73 by a user, there may be a case in which a portion of the label R hangs on any one of end portions (the wall portions) of right, left, front, rear of the recessed portion 73. In this case, the stacking ribs 75 cannot surely be engaged with the recessed portion 73, therefore a problem arises in which the plurality of magnetic tape cartridges 70 cannot be piled up stably. By the way, in the present situation, as the region for a label which is used only for the label R being pasted thereto, such wide area of the region shown in FIG. 8A is not necessary.

SUMMARY OF THE INVENTION

An object of the present invention is to provide a recording tape cartridge which always can be piled up stably while a region for a label can be secured.

In order to achieve the object described above, according to a first aspect of the present invention, there is provided a recording tape cartridge comprising: a case having a substantially boxed shape and rotatably accommodating a reel around which a recording tape is wound; a recessed portion formed on an upper surface of the case; and a stacking rib protrudingly provided on a lower surface of the case, for engaging with a recessed portion when a plurality of the recording tape cartridges is stacked, wherein a protruding portion, which defines a label region, is formed at a position in the recessed portion, which position does not interfere with a stacking rib when the plurality of the recording tape cartridges is stacked.

In a second aspect of the present invention according to the first aspect, a pair of stacking ribs are protrudingly provided on the lower surface of the case, and the protruding portion is formed at a position in the recessed portion, which position is between the pair of the stacking ribs when the plurality of the recording tape cartridges is stacked.

In a third aspect of the present invention according to the first aspect, the protruding portion comprises a continuous single member and is formed to have a frame shape in a plan view.

In a fourth aspect of the present invention according to the first aspect, the protruding portion is formed by a plurality of protruding members.

In a fifth aspect of the present invention according to the fourth aspect, the protruding portion is formed by the plurality of the protruding members so as to have a substantially frame shape without corner portions in a plan view.

In a sixth aspect of the present invention according to the first aspect, a surface of the stacking rib, which faces the protruding portion when the plurality of the recording tape cartridges is stacked, is chamfered.

In a seventh aspect of the present invention according to the sixth aspect, the surface of the stacking rib is chamfered to have a substantially circular arc shape in a cross sectional view.

In an eighth aspect of the present invention according to the first aspect, a height of the protruding portion is no greater than a depth of the recessed portion.

A ninth aspect of the present invention is a recording tape cartridge comprising: a case having a substantially boxed shape and rotatably accommodating a reel around which a recording tape is wound, the case comprising an upper case and a lower case; a recessed portion formed on an upper surface of the upper case; and a pair of stacking ribs, provided protrudingly on a lower surface of the lower case, for engaging with a recessed portion when a plurality of the recording tape cartridges is stacked, wherein a protruding portion, which defines a label region to which a label is adhered, is formed at a position in the recessed portion, which position is between a pair of the stacking ribs when the plurality of the recording tape cartridges is stacked.

A tenth aspect of the present invention is a recording tape cartridge comprising: a case having a substantially boxed shape and rotatably accommodating a reel around which a recording tape is wound, the case comprising an upper case and a lower case; a recessed portion formed on an upper surface of the upper case; and a pair of stacking ribs protrudingly provided on a lower surface of the lower case;

wherein a pair of stacking ribs of another recording tape cartridge, which has the same structure as the recording tape cartridge, engage the recessed portion of the recording tape cartridge when the other recording tape cartridge is stacked thereon, and a protruding portion, which defines a label region to which a label is adhered, is formed at a position in the recessed portion, which position is between the pair of the stacking ribs of the other recording tape cartridge when the other recording tape cartridge is stacked on the recording tape cartridge.

As described above, in the present invention, because the protruding portion defines the region to which the label is attached (adhered) at the position which does not interfere with the stacking ribs at the time of the engagement, even if the label R is adhered at a position which is shifted from the required position by the user, there arises no case in which the engagement of the stacking ribs with respect to the recessed portion is intercepted due to the label. Thereby, the recording tape cartridges can be stacked (piled up) stably always.

DETAILED DESCRIPTION OF THE INVENTION

Herebelow, a recording tape cartridge 10 relating to an embodiment of the present invention will be described on the basis of FIGS. 1 to 7. First, overall structure of the recording tape cartridge 10 will be briefly described, and then principal elements relating to the present invention will be described in detail. For convenience of explanation, a loading direction of the recording tape cartridge 10 into a drive device is shown as arrow A, and is regarded as a forward direction (front side) of the recording tape cartridge 10. The direction of an arrow B intersecting arrow A is regarded as a rightward direction.

Figure 1:
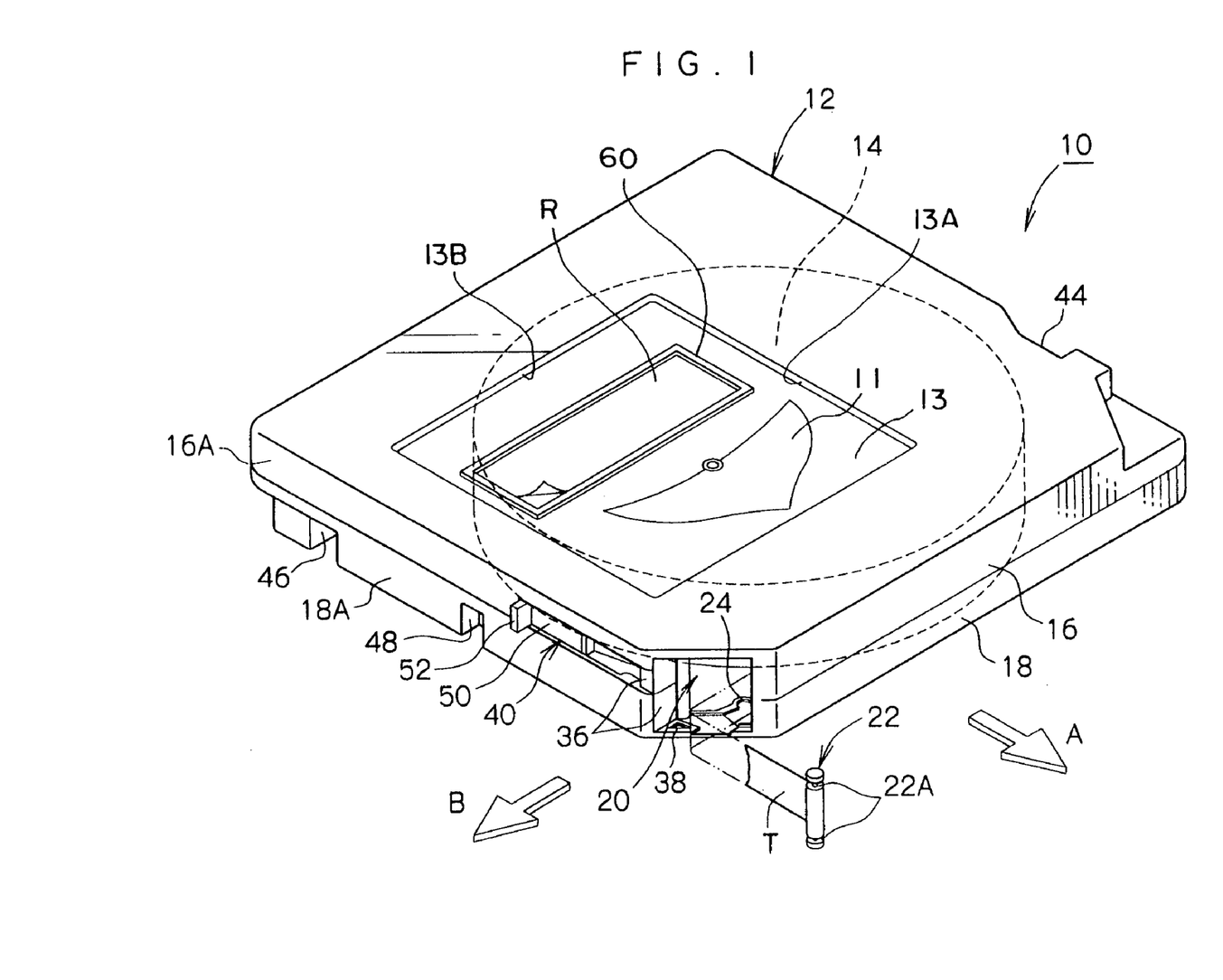
FIG. 1 is a schematic perspective view of a recording tape cartridge of an embodiment of the present invention.
Figure 2:
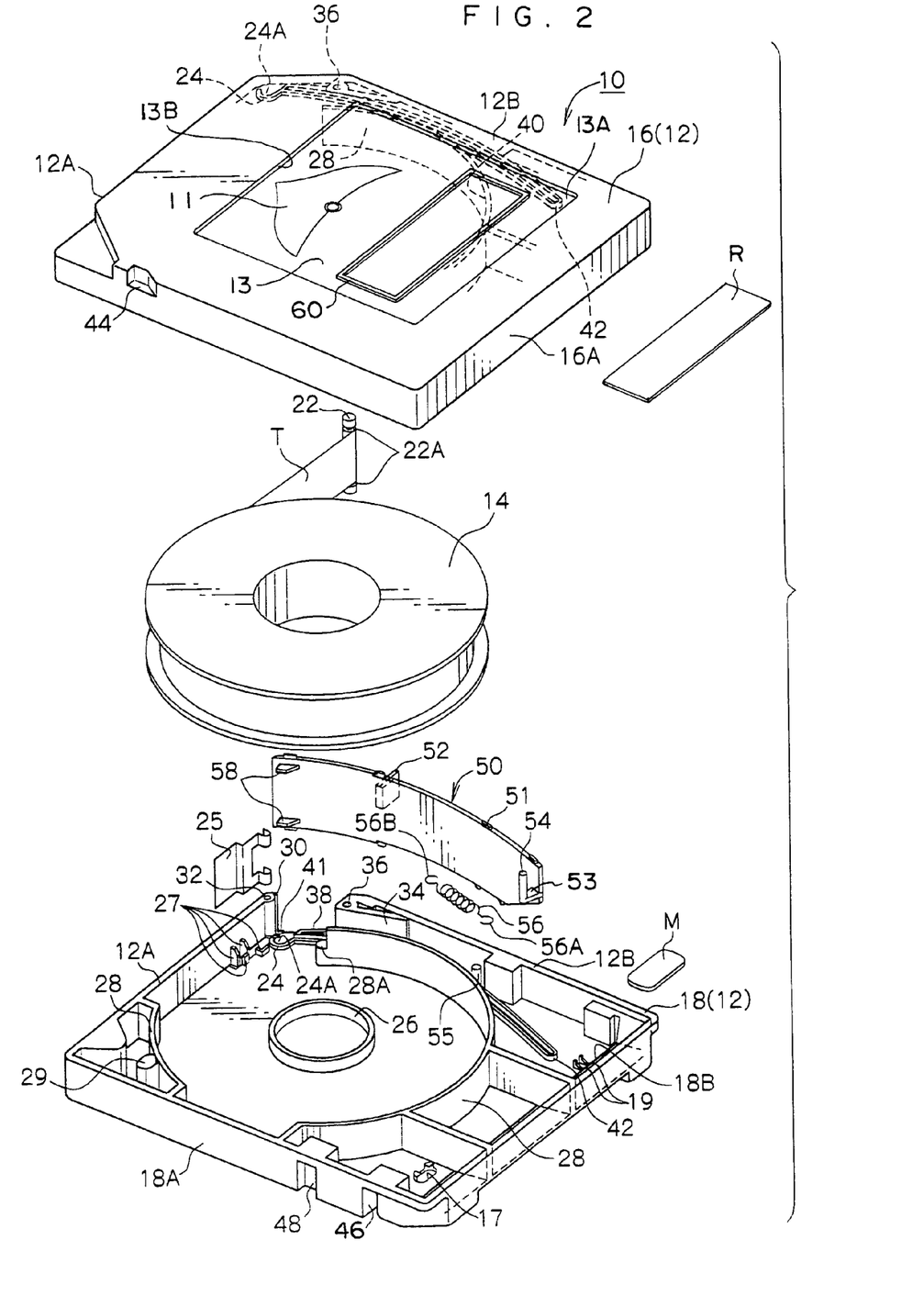
FIG. 2 is a schematic exploded perspective view of the recording tape cartridge of the embodiment of the present invention.

As shown in FIGS. 1 and 2, the recording tape cartridge 10 is structured to rotatably accommodate a single reel 14 in a case 12. The case 12 is substantially rectangular in plan view. A magnetic tape T is wound on the reel 14. The magnetic tape T serves as a recording tape which is an information recording/replaying medium. The case 12 is structured by matching up and joining a pair of peripheral walls 16A and 18A, of an upper case 16 and a lower case 18, to one another. A front-right corner portion of each of the upper case 16 and the lower case 18, which is a single corner portion at a leading side in the direction of loading into the drive device, has a cut-away form. An accommodation space for the reel 14 onto which the magnetic tape T is wound is provided inside the case 12.

The cut-away corner portions of the peripheral walls 16A and 18A of the upper case 16 and lower case 18 serve as an opening 20 for drawing out the magnetic tape T. A leader pin 22 is connected at a free end of the magnetic tape T, which is to be drawn out through the opening 20. The leader pin 22 is caught on (engaged) by drawing-out means of the drive device and subjected to a drawing-out operation. At each of two end portions of the leader pin 22, which protrude beyond width direction end portions of the magnetic tape T, an annular groove 22A is formed. These annular grooves 22A are caught on by hooks or the like of the drawing-out means. Thus, with this structure, the hooks or the like do not contact and damage the magnetic tape T when the magnetic tape T is being drawn out.

Figure 3:
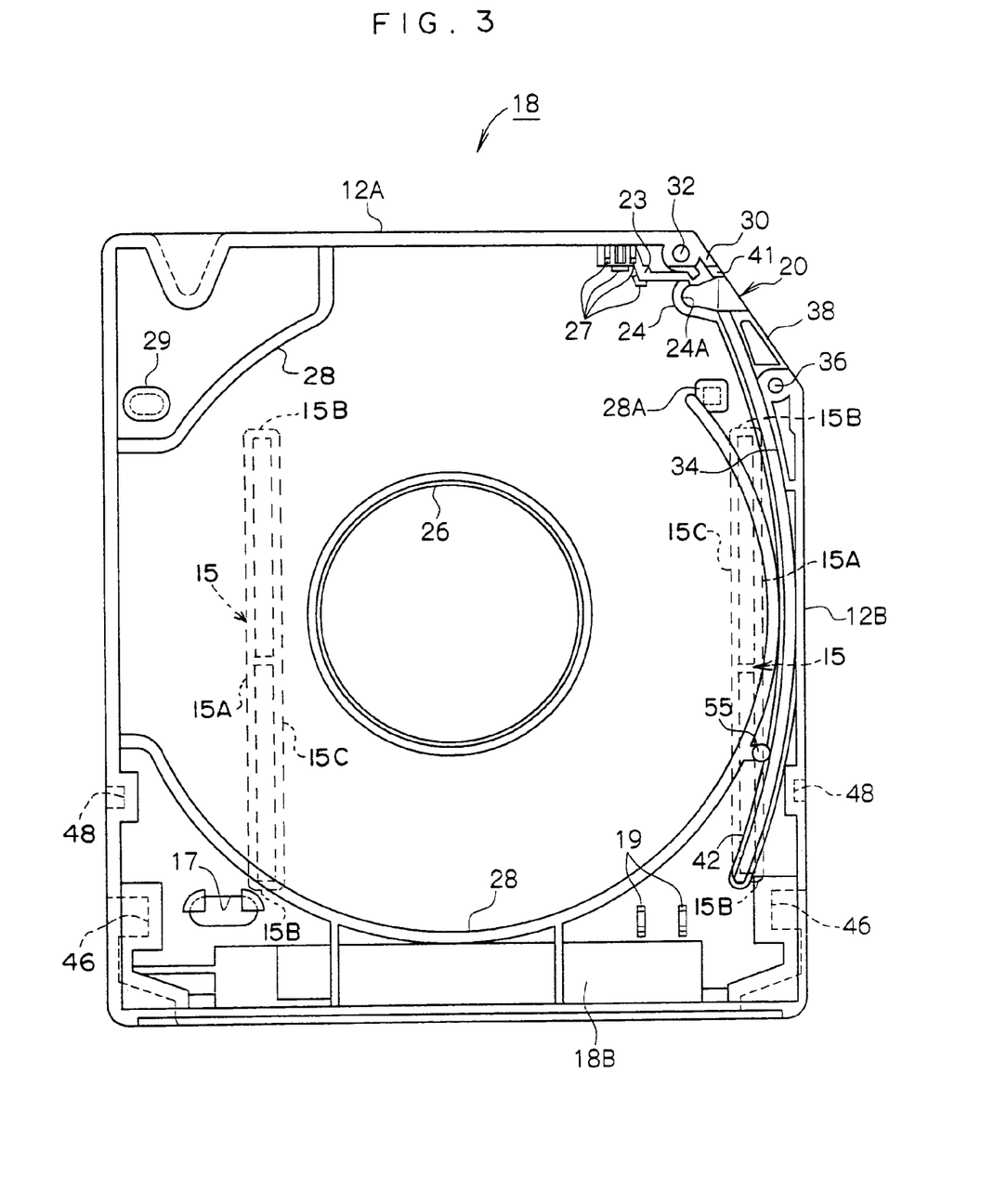
FIG. 3 is a schematic plan view of a lower case of the recording tape cartridge of the embodiment of the present invention.
Figure 4:
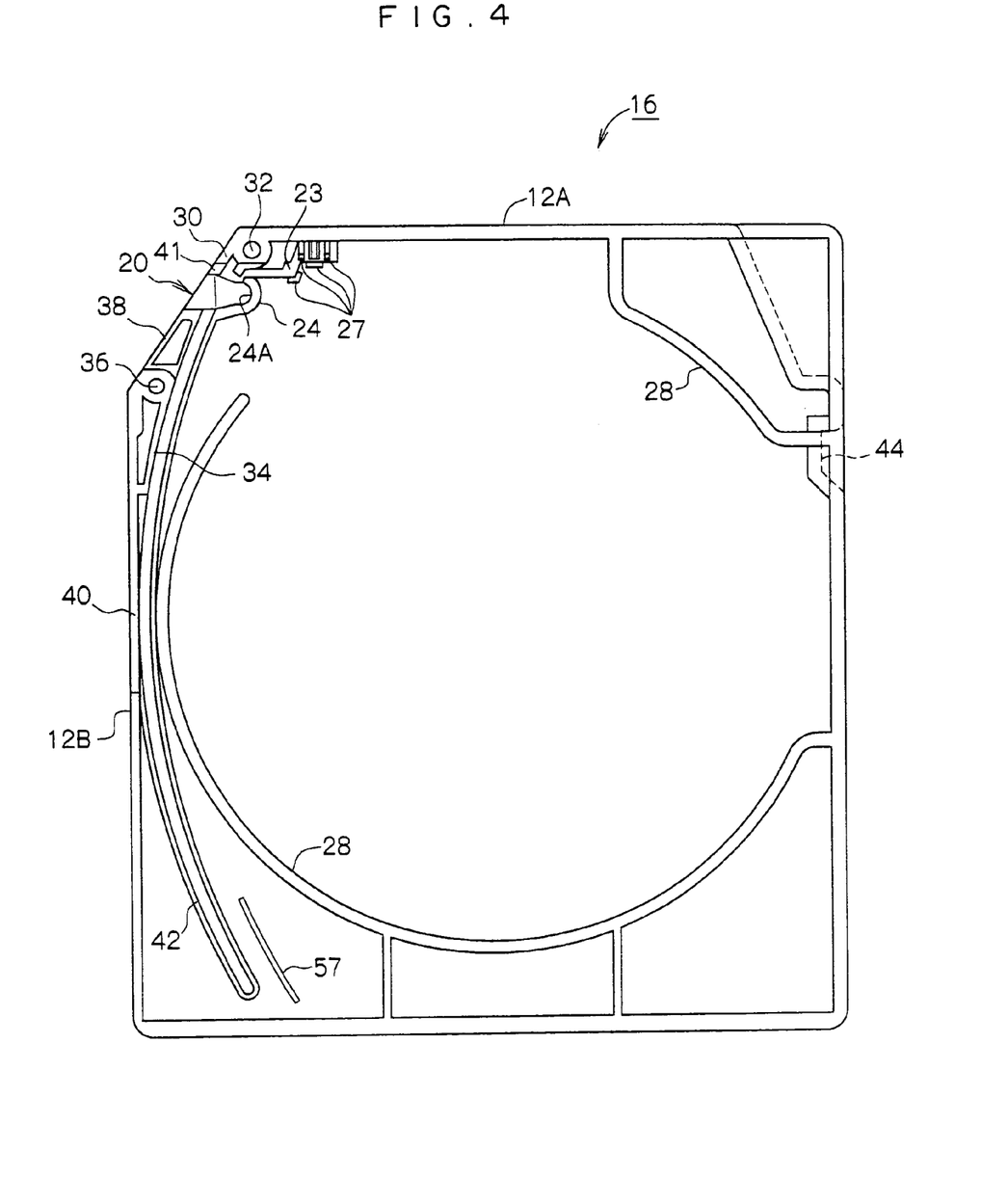
FIG. 4 is a schematic plan view of an inside of an upper case of the recording tape cartridge of the embodiment of the present invention.

At an inner side of the opening 20 of the case 12, a pair of upper and lower pin retention portions 24 are provided for positioning and retaining the leader pin 22 in the case 12. The pin retention portions 24 have semi-tubular forms, as shown in FIGS. 3 and 4, and the two end portions of the leader pin 22 are held in recess portions 24A of the pin retention portions 24 in a state in which the leader pin 22 is standing thereat. Outer peripheral walls of the pin retention portions 24 are open at a magnetic tape T drawing out side thereof, to form exit/entry aperture through which the leader pin 22 is removed and inserted.

A base portion of a leaf spring 25 is inserted at a groove portion 23 (see FIGS. 3 and 4) and a spring retention portion 27 is provided at an inner face of a front wall 12A (a portion of the peripheral walls 16A and 18A whose outer surface faces in the direction of arrow A). Thus, the leaf spring 25 is fixedly disposed in a vicinity of the pin retention portions 24. Distal end portions of a bifurcated form of the leaf spring 25 engage with upper and lower ends of the leader pin 22, and hold the leader pin 22 at the pin retention portions 24. The distal end portions of the leaf spring 25 are structured to resiliently deform appropriately when the leader pin 22 is removed or inserted at the pin retention portions 24, to allow such movements of the leader pin 22.

Further, a gear aperture 26 is formed at a central portion of the lower case 18. The gear aperture 26 is for exposing a reel gear 71 (refer to FIG. 8B) of the reel 14 to the outside. The reel gear 71 meshes with a driving gear of a drive device and the reel 14 is driven to rotate inside the case 12. The reel 14 is held by free play-restricting walls 28 so as not to rattle about. The free play-restricting walls 28 are provided projecting at portions of interior surfaces of the upper case 16 and the lower case 18, to serve as interior walls along a circular path which is coaxial with the gear aperture 26.

A hollow portion 28A is provided continuously with an end portion of the free play-restricting walls 28 in a vicinity of the opening 20. A hole is formed in the hollow portion 28A for regulation of position at the interior thereof. Further, a hollow portion 29 is provided separately from the free play-restricting walls 28 at an inner side of a front-left corner portion of the case 12. Another hole for regulation of position, which is a long hole, is formed in the hollow portion 29. The hollow portion 28A and the hollow portion 29 are disposed co-linearly along the direction of arrow B. Except for the end portion at which the hollow portion 28A is continuously provided, each of the free play-restricting walls 28 is provided continuously with the peripheral wall 16A or the peripheral wall 18A of the case 12. Accordingly, outer sides of the free play-restricting walls 28 and the space for disposing the reel 14 are set apart.

A memory board M is disposed at a rear-right portion of the lower case 18. The memory board M stores various kinds of information for each individual recording tape cartridge 10. A rear portion inside wall 18B is formed at an inclined face at a predetermined angle, the memory board M is supported by support protrusions 19, and the memory board M is inclinedly disposed at the predetermined angle. Thus, the memory board M is inclined such that the memory board M can be detected at a drive device, which reads the memory board M from a lower face side, and a library apparatus (which accommodates a plurality of recording tape cartridges 10 and performs automatically loading or unloading of the recording tape cartridge 10 for the drive device), which reads the memory board M from a rear wall side.

A write-protect portion (not shown in the drawings), which sets whether recording to the recording tape cartridge 10 is allowed or disallowed, is provided at a rear-left portion of the lower case 18. An opening hole 17, through which an operation protrusion (not shown in the drawings) for operating the write-protect portion protrudes, is piercingly provided through the rear-left portion of the lower case 18.

A pair of short upper and lower angled wall portions 30 is provided at a right end portion of the front wall 12A of the case 12. The angled wall portions 30 are inflectedly formed along an opening face of the opening 20. When the opening 20 is closed off, a distal end of a door 50 with a substantially circular arc form in plan view, which is described later, enters into an inner side of the angled wall portions 30. Hence, the angled wall portions 30 act as an anti-dust wall such that a gap through which dust and the like could ingress does not occur. A pair of upper and lower screw bosses 32 are continuously provided at an inner side of the front wall 12A, at a vicinity of a left end of the angled wall portions 30.

A pair of upper and lower angled wall portions 34 is provided at an inner side of a front end portion of a right wall 12B of the case 12 (a portion of the peripheral walls 16A and 18A whose outer surface faces in the direction of arrow B). The angled wall portions 34 are formed, in plan view, substantially along an outer peripheral face of the door 50. Front end faces of the angled wall portions 34 define a rear edge of the opening 20, and a pair of upper and lower screw bosses 36 are provided at a front end portion of the angled wall portions 34.

A slit 40 is formed in the right wall 12B of the case 12. The slit 40 has a predetermined length and serves as a window portion which communicates between the interior and exterior of the case 12. The slit 40 is for exposing an operation projection 52 of the later-described door 50. The slit 40 is formed by cutting away a front side lower portion of the peripheral wall 16A of the upper case 16 structuring the right wall 12B. The slit 40 also opens to the opening 20 side thereof. An outer surface of the screw boss 36 in the upper case 16 is exposed from the slit 40 (refer to FIG. 1).

Further, an upper end of the slit 40 may be merely defined by a top board of the case 12 (a top board of the upper case 16). However, it is preferable in a point of strength against falling or the like that a portion of the peripheral wall 16A is left at an upper side because rigidity of the case 12 can be maintained. Especially, it is further preferable that an upper side wall portion which defines the slit 40 is integrally formed with the angled wall portion 34 in a connected arrangement.

A recess portion 48 is formed at a rearward side of the lower case 18. The recess portion 48 is recessed, with a three-sided box shape (a U-shape) in cross-sectional view, toward the inside of the case 12 at a portion of the peripheral wall 18A which does not include an upper end of the peripheral wall 18A, and is recessed upward from a lower face of the case 12 (i.e., a floor plate is cut away). The recess portion 48 is also formed at a left wall of the case 12. These recess portions 48 serve as, for example, engaging portions for engaging with pulling-in means of the drive device, with bottom surfaces of the recess portions 48 (surfaces that face downward) serving as reference surfaces for positioning in the drive device.

Further, a recess portion 46 is formed at the left wall at a rearward side of the recess portion 48. The recess portion 46 is recessed, with a three-sided box shape (U shape) in cross-sectional view, toward the inside of the case 12 at a portion of the peripheral wall 18A which does not include an upper end of the peripheral wall 18A, and is recessed upward from the lower face of the case 12 (i.e., the floor plate is cut away). The recess portion 46 serves as an engagement portion which is engaged by grasping means of the library apparatus. Because these recess portions 46 and 48 are provided, twisting strength of the case 12 (the lower case 18) is improved. Further still, a recess portion 44, which has a substantially trapezoid form in plan view, is formed at an upper face portion of a left wall of the upper case 16. The recess portion 44 serves as an engaging portion at which a holding member (not shown in the drawings) engages for canceling out rotational torque when the door 50 moves in an opening direction, when the opening 20 is to be opened.

Guide wall portions 42 are provided standing from the upper case 16 and lower case 18 to predetermined heights (for example, around 1.0 mm to 1.5 mm) so as to sandwich protrusion portions 51 of the later-described door 50 from an inner face side and an outer face side thereof. The guide wall portions 42 are provided from a vicinity of the opening 20 to a vicinity of a portion of the free play-restricting walls 28 that is closest to the right wall 12B (below referred to as a "front half" of the guide wall portions 42), and from a vicinity of a rear end of the slit 40 to a vicinity of the rear wall (below referred to as a "rear half" of the guide wall portions 42).

The guide wall portions 42 are formed in substantially circular arc shapes in plan view, and a length of the guide wall portions 42 at the upper case 16 is different from a length of the guide wall portions 42 at the lower case 18. That is, the guide wall portions 42 of the upper case 16 are formed to be longer at the rear half side than the guide wall portions 42 of the lower case 18. This is because the memory board M is disposed to be inclined at the predetermined angle at the right wall 12B side of the rear portion inside wall 18B.

Rear end portions of the guide wall portions 42 are closed off in substantially circular arc shapes, in plan view, and act to restrict the rearmost of the upper and lower protrusion portions 51 such that the door 50 cannot move rearward therebeyond. Front end portions of the guide wall portions 42 are open, and are provided extending to positions such that the guide wall portions 42 do not interfere with entry or removal of the leader pin 22 at times of exit/entry of the leader pin 22 (i.e., in the drawings, at a side rearward relative to the pin retention portions 24, around half way along the opening width of the opening 20).

At a vicinity of the angled wall portions 30, guide wall portions 41 are standingly provided so as to be located on lines extending from the guide wall portions 42, and rear end portions of the guide wall portions 41 are open. These guide wall portions 41 are provided extending to a side rearward relative to a front end of the pin retention portions 24, such that rear end portions of the guide wall portions 41 do not interfere with entry or removal of the leader pin 22. A spacing (groove width) of the guide wall portions 41 is slightly narrower than a spacing (groove width) of the guide wall portions 42.

Here, the spacing (groove width) of the guide wall portions 42 is formed to be slightly wide in order to allow for variations in molding of the door 50 (variations in a rate of curvature thereof), and the protrusion portions 51 of the door 50 slide in the guide wall portions 42 in a state in which the protrusion portions 51 have a certain amount of looseness. Accordingly, at least the spacing (groove width) of the guide wall portions 41 is set to a size substantially the same as a width of the protrusion portions 51 of the door 50 (a width which includes protrusions, described later). Thus, when the opening 20 is closed, because the frontmost of the protrusion portions 51 are fitted into the guide wall portions 41, the door 50 can be retained without looseness.

The guide wall portions 41 and the front half of the guide wall portions 42 are formed to be slightly lower in height than the rear half of the guide wall portions 42. For example, a height of the guide wall portions 41 and the front half of the guide wall portions 42 may be formed to be about 1 mm and a height of the rear half of the guide wall portions 42 may be formed to be about 1.5 mm. The purpose of this is to maintain space for insertion of the drive device side drawing-out means, for chucking and drawing out the leader pin 22. Accordingly, as described later, a plate breadth (height) of the door 50 at a front half portion thereof (at least a portion that closes the opening 20) is formed to be larger (higher) in correspondence with the amount by which the guide wall portions 41 and the front half of the guide wall portions 42 are lower.

Ribs 38 are standingly provided at inner faces of the upper case 16 and the lower case 18. The ribs 38 form substantially trapezoid shapes in plan view and are integral with the outer side guide wall portions 42 that are exposed through the opening 20. The ribs 38 are provided to have substantially the same heights as the guide wall portions 42. Strengths of the upper case 16 and the lower case 18 at a portion of the opening 20 are preserved by the ribs 38. The guide wall portions 42 are continuously provided to be integral with the pin retention portions 24. It is desirable if the heights of the pin retention portions 24 are substantially equal to or higher than the heights of the guide wall portions 42 that are integrally provided continuously therewith.

The upper case 16 and the lower case 18 with the structures described above are fixed (joined) by unillustrated screws which are screwed from the lower side into each of the screw bosses 32 and 36, which are located in vicinities of edge portions of the opening 20. Accordingly, corner portions at both ends of the opening 20, which are defined by free ends of the angled wall portions 30 (the front wall 12A) and the angled wall portions 34 (the right wall 12B) and which tend to be severely affected when impacted against a floor or the like by a fall, are securely fixed. Thus, even if the case 12 is dropped, this structure will not be deformed by the overall weight of the recording tape cartridge 10 or buckled so as to cause mispositioning. Matching-up surfaces of the peripheral walls 16A and 18A (at corner portions at both ends of the opening 20) may be fixed by welding, but fixing with screws is more desirable in consideration of dismantling and recycling.

Further, the opening 20 is opened and closed by the door 50, which serves as a covering member. As shown in FIG. 2, the door 50 is formed such that a plate breadth (height) of a portion thereof that slides along the guide wall portions 41 and the front half of the guide wall portions 42 (at least the portion that closes the opening 20) is substantially the same as the opening height of the opening 20, and a further rearward side thereof is formed to be slightly smaller (lower). In addition, the plate length thereof is formed to be significantly greater than an opening width of the opening 20. Thus, in plan view, the door 50 is formed in a substantially circular arc shape, which is curved in the plate thickness direction thereof, such that the door 50 can move along a predetermined circular circumference.

The structure is provided in which the door 50 closes the opening 20 in a state in which the distal end portion of the door 50 enters an inside of the angled wall portion 30, the door 50 opens the opening 20 by slidingly moving (turning) substantially rearward along the predetermined circular circumference described above, and the opening 20 is completely open when the outer peripheral face of a distal end portion vicinity of the door 50 reaches a vicinity of the screw bosses 36. The door 50 closes the opening 20 by slidingly moving (rotating) in a direction opposite to the direction of opening the opening 20.

In this way, the door 50 is curvedly formed in the circular arc form corresponding to the predetermined circular circumference, which is the movement path of the door 50. A position in a left-right direction of a center of rotation thereof in the present embodiment is set to a left end vicinity of the case 12. A position of the same in a front-rear direction is set to a vicinity of the rear end of the slit 40. Therefore, the movement path of the door 50 comes closest to the right wall 12B of the case 12 at the rear end vicinity of the slit 40. The center and radius of rotation of the door 50 can be suitably determined in accordance with positions of front and rear edge portions of the opening 20 (the angled wall portions 30 and the screw bosses 36), which are determined by requirements of a drive device, an angle of the angled opening face of the opening 20, which is determined by requirements of a library apparatus, or the like.

A curved length dimension of the door 50 is determined such that a rear end portion of the door 50 is disposed in a rear-right corner portion (in a vicinity of the recess portion 46) of the case 12, which is rearward relative to the recess portion 48 when the opening 20 is in the closed state. A lower rear portion of the door 50 is cut away at an angle so as to avoid the memory board M, which is inclinedly disposed at the predetermined angle at the rear portion inside wall 18B side of the lower case 18.

The protrusion portions 51 are protrudingly provided at upper and lower faces of the door 50 and respectively abut against guide faces (inner faces which face one another) of the guide wall portions 41 and the guide wall portions 42 and against inner faces of the upper case 16 and the lower case 18 between the guide wall portions 41 and between the guide wall portions 42. The protrusion portions 51 guide the door 50 in an opening-closing direction of the opening 20. These protrusion portions 51 are formed in substantially elliptical shapes in plan view, which are long along the length direction of the door 50. Four of the protrusion portions 51 are provided at the upper face and four of the protrusion portions 51 are provided at the lower face. The protrusion portions 51 are protrudingly provided such that the upper and lower protrusion portions 51 are symmetrical, except for the rearmost protrusion portions 51, and such that heights thereof are substantially equal to heights of the guide wall portions 41 and the guide wall portions 42 (for example, the protrusion portions 51 at a front side relative to a boundary portion at which the plate breadth of the door 50 changes are about 0.5 mm high, and the protrusion portions 51 at a rear side of the same are about 1.5 mm high). The rearmost of the protrusion portions 51 are not vertically symmetrical because the lower rear portion of the door 50 is cut away at an angle.

Distal ends of the protrusion portions 51 are formed so as to be substantially circular arc-shaped in sectional view (side view), and the protrusions (not show in the drawings) are protrudingly provided, across the whole height of the protrusion portions 51, in substantially circular arc shapes in plan view, substantially triangular shapes in plan view, or the like, at faces at both sides of the protrusion portions 51. Consequently, when the protrusion portions 51 are inserted and slid between the guide wall portions 42, only the substantially circular arc-shaped distal ends of the protrusion portions 51 make contact with the inner face of the upper case 16 and the inner face of the lower case 18, which is linear contact. In addition, only the circular arc or the like-shaped distal ends of the protrusions make contact with the mutually opposing guide faces of the guide wall portions 42, which is similarly linear contact.

Accordingly, with this structure, sliding resistance (friction) of the upper and lower protrusion portions 51 with the inner faces of the upper case 16 and lower case 18 between the guide wall portions 41 and between the guide wall portions 42 and with the guide faces of the guide wall portions 41 and 42 can be reduced, and the door 50 can be smoothly slid with less resistance. Furthermore, because the protrusion portions 51 are formed in substantially elliptical shapes in plan view, impact resistance is more excellent than if the protrusion portions 51 were formed in, for example, substantially circular shapes in plan view. Therefore, there is no concern about the protrusion portions 51 being bent if forces in directions other than the opening-closing direction act on the door 50 due to the impact of a fall or the like.

At an outer peripheral surface of the door 50, slightly frontward relative to a longitudinal direction central portion of the door 50 (at a vicinity of the boundary portion at which the plate breadth of the door 50 changes), the operation projection 52 projects along a diametric direction of the door 50, to serve as an operation portion. The operation projection 52 is exposed to the outside of the case 12 through the slit 40. When the opening 20 is in the closed state, the operation projection 52 is disposed to be slightly separated from a rear end of the screw bosses 36, and is operable through the portion of the slit 40 that opens frontward. When the opening 20 is in the opened state, the operation projection 52 is disposed to be slightly separated from the rear edge of the slit 40. At this time, the rearmost of the protrusion portions 51 abut against the rear end portions of the guide wall portions 42.

Although the slit 40 for exposing the operation projection 52 communicates between the interior and exterior of the case 12, adherence of dust and the like to the magnetic tape T wound onto the reel 14 is prevented by the slit 40 being constantly substantially closed off by the screw bosses 36 and the door 50, which spans substantially the whole height of the interior of the case 12, and by the free play-restricting walls 28 serving as an inner wall.

A coil spring 56, which serves as urging means for urging the door 50 in the direction of closing the opening 20, has a length that reaches as far as the rear-right corner portion of the case 12 in the state in which the door 50 closes the opening 20. Thus, the coil spring 56 is disposed to effectively utilize a space between the free play-restricting walls 28 and the right wall 12B (the peripheral walls 16A and 18A) at the rear-right corner portion. That is, a spring-holding portion, which has a substantial L-shape in rear view, is provided at the inner peripheral face of a rear end vicinity of the door 50. The spring-holding portion is formed and provided such that a supporting plate 53 is integrally provided at the door 50 in a protruding manner, and a circular column form holding protrusion 54 is provided integrally on an upper surface of the supporting plate 53 protruding upward.

Further, a circular column form anchoring protrusion 55 is provided protruding upward from the inner face of the lower case 18 in a vicinity of the recess portion 48. Ring-like attachment portions 56A and 56B are formed at the coil spring 56, one at each end thereof. Accordingly, the attachment portion 56B at one end of the coil spring 56 is fitted over the anchoring protrusion 55 from thereabove, and the attachment portion 56A at the other end of the coil spring 56 is fitted over the holding protrusion 54 from thereabove. Thus, the coil spring 56 can be attached in the space mentioned above with ease.

A rib 57, which slidingly contacts an upper end of the holding protrusion 54 when the door 50 is opening or closing, is provided standing in a substantially circular arc form, in plan view, at the upper case 16. The rib 57 is provided with location and length so as to slidingly contact the upper end of the holding protrusion 54 at least when the door 50 starts to move (for opening). Because the rib 57 suitably guides the holding protrusion 54, which is moving against urging force of the coil spring 56, the door 50 opens more stably (i.e., the door 50 is not caused to vibrate by the urging force of the coil spring 56 while opening).

Moreover, even if an impact due to falling or the like acts on the case 12 and the attachment portion 56A of the coil spring 56 rises up along the holding protrusion 54, because this rib 57 is provided, the attachment portion 56A can be prevented from detaching from the holding protrusion 54. Further, an upper end of anchoring protrusion 55 is inserted between the free play-restricting wall 28 of the upper case 16 and the guide wall portions 42. Thus, the attachment portion 56B can be similarly prevented from detaching from the spring-anchoring portion 55.

Stoppers 58, which abut against an upper end portion side face and a lower end portion side face of the leader pin 22 when the opening 20 is closed, are protrudingly provided at the inner face of a front end portion of the door 50. Consequently, detachment of the leader pin 22 from the pin retention portions 24 due to dropping impacts and the like can be more reliably prevented. In addition, it is preferable if an inner face and/or an outer face of the front end portion of the door 50 which enters the guide wall portions 41 is formed to a tapered face, in order that the door 50 can smoothly enter between the guide wall portions 41.

In the recording tape cartridge 10 having the structure mentioned above, as shown in FIGS. 1, 2 and 5, a recessed portion 13, which is recessed and has a substantial square shape in a plane view, is formed at the upper surface of the case 16. The recessed portion 13 is provided such that the recessed portion 13 can be engaged with a pair of stacking ribs 15 provided in a protruding manner at the lower surface of the lower case 18 in order that the recording tape cartridges 10 (the cases 12) can be piled up stably. The recessed portion 13 is formed such that a length in a left-and-right direction thereof is the same as a distance W between a left outside surface 15A and a right outside surface 15A of the stacking ribs 15, and a length in a front-and-rear direction thereof is the same as that of the stacking ribs 15. A depth of the recessed portion 13 is the same as a protruding height of the stacking ribs 15.

Figure 5:
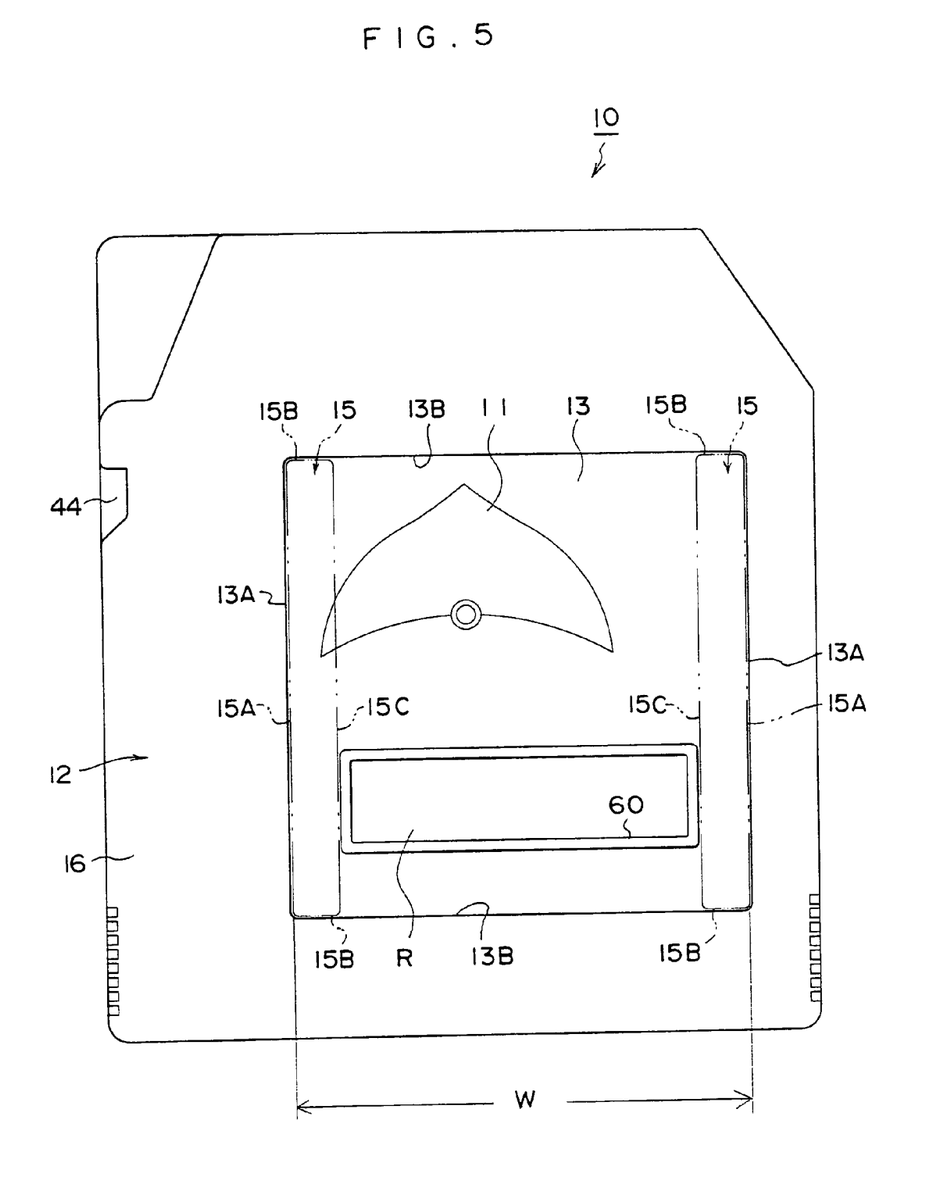
FIG. 5 is a schematic plan view of an outside of the upper case of the recording tape cartridge of the embodiment of the present invention.
Figure 6:
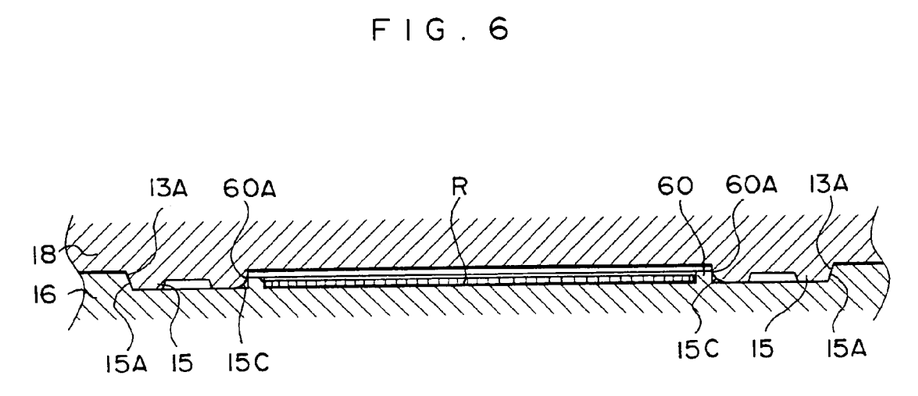
FIG. 6 is a schematic cross sectional view showing a recessed portion and stacking ribs of the piled up recording tape cartridges of the embodiment of the present invention.
Figure 7:
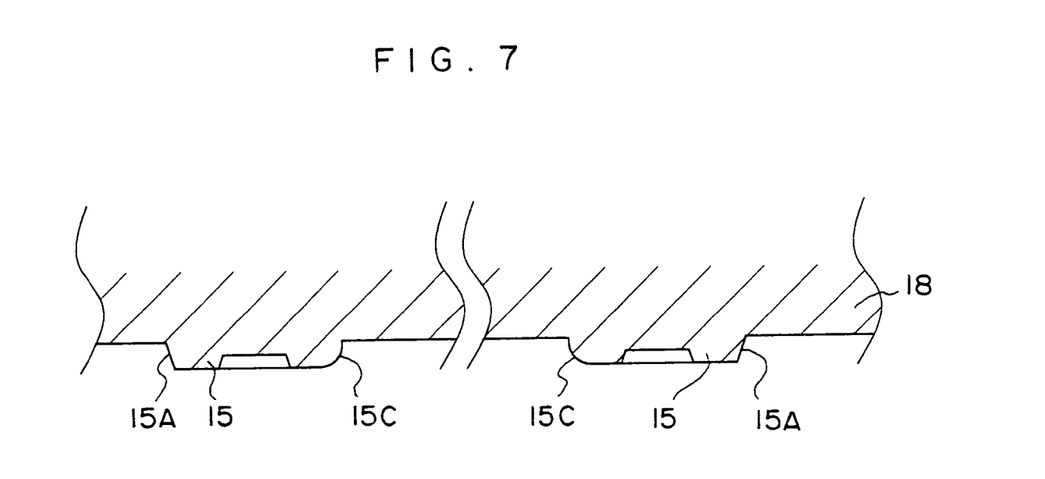
FIG. 7 is a schematic cross sectional view showing the stacking ribs of the embodiment of the present invention.

As shown in FIGS. 3, 6 and 7, the two stacking ribs 15 are provided to protrude from the lower surface of the lower case 18 such that the two stacking ribs 15, each having a predetermined length and a predetermined width, run in a direction which is parallel to the front and rear direction of the case 12 (a loading direction to the drive device) and have a predetermined interval therebetween. The protruding height of the stacking ribs 15 is about 0.5 mm–1.0 mm. When the recording tape cartridges 10 (the cases 12) are piled up, the left outside surface 15A and the right outside surface 15A of the stacking ribs 15 are abutted to engage with a left wall portion 13A and a right wall portion 13A of a left edge and a right edge of the recessed portion 13, respectively. Further, front outside surfaces 15B and the rear outside surfaces 15B of the stacking ribs 15 are abutted to engage with a wall portion 13B of a front edge and a wall portion 13B of a rear edge of the recessed portion 13. As a result, the recording tape cartridges 10 (the cases 12) can be piled up stably (refer to FIGS. 5 and 6).

Further, as shown in FIG. 5, a protruding portion 60 which defines a label region (a region at which a label is stuch) is provided in a protruding manner at a predetermined position in the recessed portion 13, which does not interfere with positions of the stacking ribs 15 at a time of the engagement, that is, at a position between a left inside surface 15C and a right inside surface 15C of the stacking ribs 15 at the time of the engagement. The protruding portion 60 has a rectangle-frame shape in a plane view. The protruding portion 60 is formed to have a predetermined width thereof. A height of the protruding portion 60 is the same as the depth of the recessed portion 13 (a height of the stacking ribs 15), or, preferably, is smaller that the depth of the recessed portion 13 slightly, as shown in FIG. 6. Accordingly, there is no problem in which a lower side recording tape cartridge 10 (case 12) pushes up from downside (interferes with) an upper side tape cartridge 10 (case 12) which is piled onto the lower side recording tape cartridge 10 when the recording tape cartridges 10 (the cases 12) are piled up. Therefore, the recording tape cartridges 10 (the cases 12) can be piled up stably always.

As shown in FIG. 1, a label R is stuck within the protruding portion 60 (within the frame formed by the protruding portion 60). The region defined by the protruding portion 60 is located, not at the sides of the outside surface 15A and the right outside surface 15A of the stacking ribs 15 engaging with the recessed portion 13, but between the left inside surface 15C and the right inside surface 15C of the stacking ribs 15 at the time of the above mentioned engagement. Therefore, even if the label R is stuck at a position which is shifted from the required position, and a portion of the label R hangs on a portion of the protruding portion 60, the engagement of the stacking ribs 15 with respect to the recessed portion 13 is not obstructed. Further, the inside surface 15C, that is, the surface at the protruding portion 60 side, of the stacking rib 15 is formed to have a substantial circular arc configuration in a cross sectional view as shown in FIGS. 6 and 7 (that is, the inside surface 15C of the stacking rib 15 is chamfered). Therefore, there is no problem in which the stacking rib 15 hurts an edge 60A (an outside corner portion) of the protruding portion 60 when the recording tape cartridges 10 are piled up. Further, there is no problem in which the stacking rib 15 interferes with the label R which hangs on the protruding portion 60 due to a paste-position being shifted, thereby the label R is stripped when taking up the piled up recording tape cartridge 10.

Figure 9:
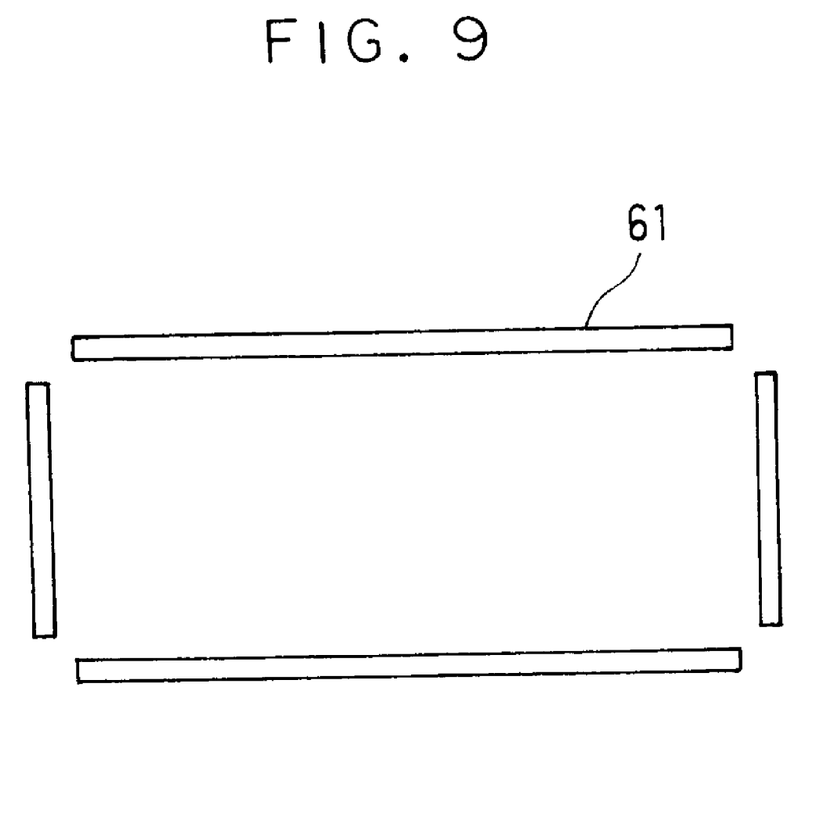
FIG. 9 is a plan view of another example of a protruding portion of the present invention.

The label region which is defined by the protruding portion 60 is smaller than a label region of the conventional recording tape cartridge. However, as long as the region serves as a region on which the user sticks a label for identification or the like, it is sufficient for the label region to have this degree of an area. Further, the protruding portion 60 shown in the drawings in the present embodiment has a rectangle-frame shape in a plane view, and is continuously formed. However, the present invention is not limited to the same shown in the drawings. In the protruding portion 60 relating to the present invention, it is sufficient that the protruding portion 60 can merely define the label region. Accordingly, for example, a protruding portion 61, shown in FIG. 9, which has a substantial rectangle-frame shape in a plane view, but is not continuously formed such that corner portions of the rectangle-frame are removed, can be provided. Further, in the present embodiment, a pattern 11 which indicates a loading direction of the recording tape cartridge 10 or the like is formed within the recessed portion 13. A protruding height of the pattern 10 is smaller than the depth of the recessed portion 13 for the similar reason mentioned above.

Next, operation of the present embodiment will be described. In the recording tape cartridge 10 having the structure described above, the opening 20 is closed by the door 50 when the recording tape cartridge 10 is not in use (during storage, during transportation, and the like). Specifically, the door 50 is urged in the closing direction of the opening 20 by the urging force of the coil spring 56, and the door 50 closes the opening 20 in the state in which the distal end portion (front end portion) of the door 50 is entered between the guide wall portions 41 in the vicinity of the angled wall portions 30.

On the other hand, when the magnetic tape T is to be used, the recording tape cartridge 10 is loaded into a drive device along the direction of arrow A. In accordance with this loading, the opening/closing member (not shown in the drawings), which structures opening/closing means of the drive device, advances into the slit 40 which opens frontward, and engages with the operation projection 52 of the door 50. In this state, as the recording tape cartridge 10 (the case 12) is pushed in further, the urging force of the coil spring 56 is opposed by a force of pushing in, and the opening/closing member moves the operation projection 52 rearward (that is, relatively rearward with respect to the case 12 which is being loaded in the direction of arrow A). The opening/closing member projects in a direction intersecting a direction of the insertion of the recording tape cartridge 10.

Accordingly, the protrusion portions 51 of the door 50, at which the operation projection 52 is protrudingly provided, are guided by the guide wall portions 42 and the door 50 rotates clockwise, in plan view, along the direction of curvature thereof. That is, the door 50 moves substantially rearward so as to swing at the outer side of the pin retention portions 24 and the reel 14 without significantly deviating from the movement path along the shape of the curvature, and thus the door 50 opens the opening 20. Hence, when the case 12 (the recording tape cartridge 10) is loaded to a predetermined depth in the drive device, the opening 20 is completely opened.

Because the rib 57 suitably guides the holding protrusion 54 to which the one end of the coil spring 56 is attached, the coil spring 56 suitably extends between the guide wall portion 42 and the rib 57 in a plane view. Accordingly, the vibration of the coil spring 56 itself can be suppressed, the door 50 can move stably without vibrating even in a state in which the door 50 is against urging force of the coil spring 56. Therefore, the opening 20 can be opened in a always stable state.

In the state in which the opening 20 has been opened in this manner and the recording tape cartridge 10 has been positioned in the drive device, further rotation (substantially rearward movement) of the door 50 is limited, and the drawing-out means of the drive device advances into the case 12 through the opened opening 20. The drawing-out means takes out the leader pin 22, which had been positioned and retained at the pin retention portions 24. At this time, the tip end of the leaf spring 25 is elastically deformed appropriately so as to allow taking out of the leader pin 22 from the pin retention portions 24. Then, the leader pin 22 s accommodated at an unillustrated winding reel, and then the winding reel and the reel 14 are driven to rotate contemporaneously, and the magnetic tape T is wound around the winding reel while being sequentially drawn out from the case 12. At this time, recording and/or replaying of information is carried out by a recording/replaying head or the like which is disposed along a predetermined tape path.

On the other hand, when the magnetic tape T has been wound back to the reel 14 again and the recording tape cartridge 10 is to be ejected from the drive device, the state of positioning of the recording tape cartridge 10 is released and the recording tape cartridge 10 is moved in the direction opposite to the direction of arrow A by the urging force of the coil spring 56 and/or by an unillustrated ejection mechanism. The protrusion portions 51 of the door 50 are guided at the guide wall portions 42, while the door 50 is rotated in the closing direction of the opening 20 by the urging force of the coil spring 56. Due to the distal end portion of the door 50 entering in between the guide wall portions 41, the door 50 returns to the initial state in which the opening 20 is completely closed.

Here, in a case in which a plurality of the recording tape cartridges 10 (the cases 10) are piled up, for example, in a case in which the recording tape cartridges 10 are stored, the left outside surface 15A and the right outside surface 15A, and the front outside surfaces 15B and the rear outside surfaces 15B of the pair of the stacking ribs 15 formed at the lower surface of the lower case 18, are engaged with the left wall portion 13A and the right wall portion 13A, and the front wall portion 13B and the rear wall portion 13B of the recessed portion 13 formed at the upper surface of the upper case 16. As a result, the recording tape cartridges 10 (the cases 12) can be piled up stably. Further, at this time, because the protruding portion 60 defines the label region at the position between the left inside surface 15C and the right inside surface 15C of the stacking ribs 15, which does not interfere with positions of the stacking ribs 15 at the time of the engagement, even if the label R is stuck, there arises no problem in which the engagement of the stacking ribs 15 with respect to the recessed portion 13 is obstructed. Further, because the inside surface 15C of the stacking rib 15 is formed to have a substantial circular arc configuration in a cross sectional view, there arises no problem in which inside surface 15C interferes with the label R thereby the label R is stripped even if the label R hangs on the protruding portion 60 due to a paste-position being shifted.

As described above, in the present invention, because the protruding portion defines the region to which the label is adhered at the position which does not interfere with positions of the stacking ribs at the time of the engagement, even if the label R is adhered at a state in which the label is shifted from the required position by the user, there arises no problem in which the engagement of the stacking ribs with respect to the recessed portion is intercepted due to the label. Thereby, the recording tape cartridges (the cases) can be stacked stably always.

What is claimed is:

1. A recording tape cartridge comprising:
   a case having a substantially boxed shape and rotatably accommodating a reel around which a recording tape is wound;
   a recessed portion formed on an upper surface of the case; and
   a stacking rib protrudingly provided on a lower, surface of the case, for engaging with a recessed portion of an identical recording tape cartridge positioned below the recording tape cartridge, when the recording tape cartridge and the recording tape cartridge positioned below the recording tape cartridge are stacked,
   wherein a protruding portion, which defines a label region, is formed at a position in the recessed portion of the recording tape cartridge, which position does not interfere with a stacking rib of an identical recording tape cartridge positioned above the recording tape cartridge, when the recording tape cartridge and the recording tape cartridge positioned above the recording tape cartridge are stacked,
   wherein the protruding portion of the recording tape cartridge extends in a substantially perpendicular direction from a bottom surface of the recessed portion of the recording tape cartridge, and has a substantially frame shape in a plane view, and
   the protruding portion of the recording tape cartridge substantially surrounds the label region on which a label is adhered.

2. A recording tape cartridge according to claim 1, wherein a pair of the stacking ribs of the recording tape cartridge is protrudingly provided on the lower surface of the case, and the protruding portion of the recording tape cartridge is formed at a position in the recessed portion of the recording tape cartridge, which position is between a pair of stacking ribs of the cartridge positioned above the recording tape cartridge when the recording tape cartridge and the recording tape cartridge positioned above the recording tape cartridge are stacked.

3. A recording tape cartridge according to claim 1, wherein the protruding portion of the recording tape cartridge comprises a continuous single member and is formed to have a frame shape in a plan view.

4. A recording tape cartridge according to claim 1, wherein the protruding portion of the recording tape cartridge is formed by a plurality of protruding members.

5. A recording tape cartridge according to claim 4, wherein the plurality of the protruding members are positioned, in combination, to have a substantially frame shape without corner portions in a plan view.

6. A recording tape cartridge according to claim 1, wherein a surface of the stacking rib provided on the lower surface of the case, which faces the protruding portion of the recording tape cartridge positioned below the recording tape cartridge, when the recording tape cartridge and the recording tape cartridge positioned below the recording tape cartridge are stacked, is chamfered.

7. A recording tape cartridge according to claim 6, wherein the surface of the stacking rib provided on the lower surface of the case is chamfered to have a substantially circular arc shape in a cross sectional view.

8. A recording tape cartridge according to claim 1, wherein a height of the protruding portion of the recording tape cartridge is no greater than a depth of the recessed portion of the recording tape cartridge.

9. A recording tape cartridge according to claim 1, wherein a center of the label region, that is substantially surrounded by the protruding portion of the recording tape cartridge, is level with the bottom surface of the recessed portion of the recording tape cartridge.

10. A recording tape cartridge comprising:
a case having a substantially boxed shape and rotatably accommodating a reel around which a recording tape is wound, the case comprising an upper case and a lower case;
a recessed portion formed on an upper surface of the upper case; and
a pair of stacking ribs, provided protrudingly on a lower surface of the lower case, for engaging with a recessed portion of an identical recording tape cartridge positioned below the recording tape cartridge when the recording tape cartridge and the recording tape cartridge positioned below the recording tape cartridge are stacked,
wherein a protruding portion, which defines a label region to which a label is adhered, is formed at a position in the recessed portion of the recording tape cartridge, which position is between a pair of the stacking ribs of an identical recording tape cartridge positioned above the recording tape cartridge when the recording tape cartridge and the recording tape cartridge positioned above the recording tape cartridge are stacked,
wherein the protruding portion of the recording tape cartridge extends in a substantially perpendicular direction from a bottom surface of the recessed portion of the recording tape cartridge, and has a substantially frame shape in a plane view, and
the protruding portion of the recording tape cartridge substantially surrounds the label region.

11. A recording tape cartridge according to claim 10, wherein
the protruding portion of the recording tape cartridge comprises a continuous single member and is formed to have a frame shape in a plan view.

12. A recording tape cartridge according to claim 10, wherein the protruding portion of the recording tape cartridge is formed by a plurality of protruding members.

13. A recording tape cartridge according to claim 12, wherein the plurality of protruding members are positioned, in combination, to have a substantially frame shape without corner portions in a plan view.

14. A recording tape cartridge according to claim 10, wherein each surface of the pair of the stacking ribs of the recording tape cartridge, which faces the protruding portion of the recording tape cartridge positioned below the recording tape cartridge when the recording tape cartridge and the recording tape cartridge positioned below the recording tape cartridge are stacked, is chamfered.

15. A recording tape cartridge according to claim 14, wherein each surface of the pair of the stacking ribs of the recording tape cartridge is chamfered to have a substantially circular arc shape in a cross sectional view.

16. A recording tape cartridge according to claim 10, wherein a height of the protruding portion of the recording tape cartridge is no greater than a depth of the recessed portion of the recording tape cartridge.

17. A recording tape cartridge according to claim 10, wherein a center of the label region, that is substantially surrounded by the protruding portion of the recording tape cartridge, is level with the bottom surface of the recessed portion of the recording tape cartridge.

18. A recording tape cartridge comprising:
a case having a substantially boxed shape and rotatably accommodating a reel around which a recording tape is wound, the case comprising an upper case and a lower case;
a recessed portion formed on an upper surface of the upper case; and
a pair of stacking ribs protrudingly provided on a lower surface of the lower case;
wherein a pair of stacking ribs of a recording tape cartridge positioned above the recording tape cartridge, which has the same structure as the recording tape cartridge, engage the recessed portion of the recording tape cartridge when the recording tape cartridge positioned above the recording tape cartridge is stacked on the recording tape cartridge, and
a protruding portion, which defines a label region to which a label is adhered, is formed at a position in the recessed portion, which position is between the pair of stacking ribs of the recording tape cartridge positioned above the recording tape cartridge when the recording tape cartridge positioned above the recording tape cartridge is stacked on the recording tape cartridge,
wherein the protruding portion extends in a substantially perpendicular direction from a bottom surface of the recessed portion, and has a substantially frame shape in a plane view, and
the protruding portion substantially surrounds the label region.

19. A recording tape cartridge according to claim 18, wherein a center of the label region, that is substantially surrounded by the protruding portion, is level with the bottom surface of the recessed portion.

* * * * *